(12) United States Patent
Fujimaki

(10) Patent No.: US 6,507,612 B1
(45) Date of Patent: Jan. 14, 2003

(54) BUS ACCESS CONTROLLER

(75) Inventor: Osamu Fujimaki, Yamanashi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/343,272

(22) Filed: Jun. 30, 1999

(30) Foreign Application Priority Data

Jul. 1, 1998 (JP) .......................................... 10-186221

(51) Int. Cl.$^7$ .................................................. H04Q 1/20
(52) U.S. Cl. ...................................... 375/224; 710/107
(58) Field of Search ................................. 710/107, 120, 710/109, 110, 116, 119; 375/224, 220, 351

(56) References Cited

U.S. PATENT DOCUMENTS

| 4,085,448 A | * | 4/1978 | Kogge .......................... 710/107 |
| 4,149,241 A | * | 4/1979 | Patterson .................... 710/107 |
| 5,581,713 A | * | 12/1996 | Myers et al. ............... 710/113 |

FOREIGN PATENT DOCUMENTS

JP 5-257871 10/1993

* cited by examiner

Primary Examiner—Stephen Chin
Assistant Examiner—Kevin Kim
(74) Attorney, Agent, or Firm—Sughrue Mion, PLLC

(57) ABSTRACT

A bus control circuit of the present invention, which is connected to a request source through a bus, includes a first element which detects a fault of one part of the bus when data is sent through all parts of the bus and a second element which outputs a signal showing that it is impossible to send data through all parts of the bus to the request source when the first element detects the fault. A bus control system of the present invention has a host device, a control circuit, and a bus which connects the host device and the control circuit and includes a first part and a second part. The system includes a first element which is provided in the control circuit and detects a fault of the first part when the host device sends data through the first and second parts. A second element is provided in the control circuit and outputs a signal showing that it is impossible to send data through the first and second parts to the host device. The host device includes a third element which receives the signal and starts to send data through the second part.

12 Claims, 4 Drawing Sheets

BUS ACCESS CONTROLLER

BACKGROUND OF THE INVENTION

The present invention relates to a bus access controller, and more particularly, to a bus access controller which changes bus width for data transfer.

In a conventional PCI device supporting a 64-bit bus, if the high 32-bit bus fails, the system ends abnormally after reporting the fault as a critical error even if the low 32-bit bus has no problem.

Japanese Patent Application Laid-Open Hei No. 5-257871 discloses a data bus control system which continues data transfer between a control circuit and a disk drive using a first bus if a second bus fails while transferring data through the first and second buses.

The above data bus control system has an error detection circuit provided on the first and second buses, and uses the second bus when the error detection circuit detects that the first bus fails. However, bus width for data transfer is selected after a request source starts the data transfer. This creates a problem because the system cannot correct an error on the bus between the request source and the control circuit.

SUMMARY OF THE INVENTION

An object of the invention is to provide a bus access controller which performs a data transfer from a request source by using a low order bus if a high order bus fails and the low order bus is operating normally.

Another object of the invention is to provide a bus access controller which transfers data after selecting a transfer mode at the time of requesting data transfer.

Another object of the invention is to provide a bus access controller which can handle intermittent faults and faults of the low order bus.

According to one aspect of the present invention, a bus control circuit is provided which includes: a first element which detects a fault of one part of the bus when data is sent through all part of the bus; and a second element which output a signal showing that it is impossible to send data through all parts of the bus to the request source when the first element detects the fault.

According to another aspect of the present invention, a bus control circuit is provided which includes: a first element which observes a signal on a low order of the bus; a second element which detects a fault of the first element; a third element which selects and outputs the signal on the low order of the bus or a signal on a high order of the bus based on the detection performed by the second element; and a fourth element which observes an output from the third element.

According to another aspect of the present invention, a bus control system is provided which includes: a host device; a control circuit; a bus which connects the host device and the control circuit and includes a first part and a second part; a first element which is provided in the control circuit and detects a fault in the first part when the host device sends data through the first and second parts; a second element which is provided in the control circuit and outputs a signal indicating that it is impossible to send data through the first and second parts to the host device; and third element which is provided in the host device, receives the signal and starts to send data through the second part.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

A first embodiment of the present invention will be described in detail below.

Figure 1:
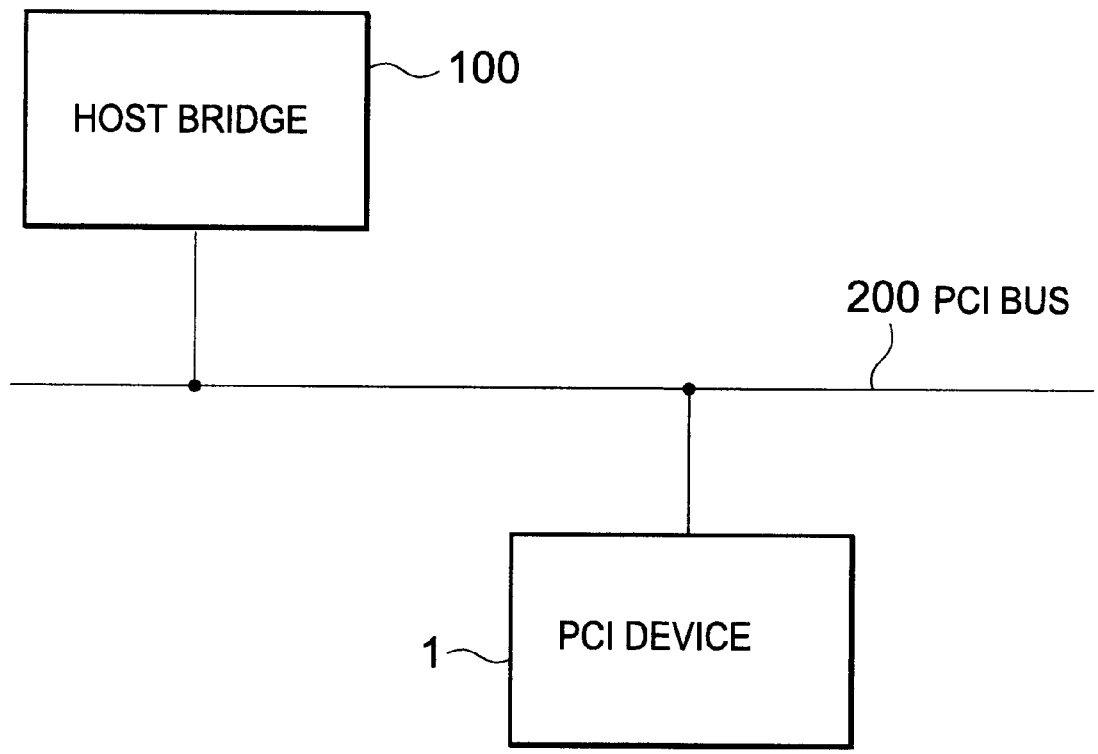
FIG. 1 is a block diagram of a first embodiment of the present invention.

Referring to FIG. 1, PCI device 1 is a bus access controller that is connected to a PCI bus 200. PCI device 1 is connected to a source of a request. In this embodiment, the source of the request is a host bridge 100. Another PCI device which connected to the PCI bus may be applied as the request source.

Figure 2:
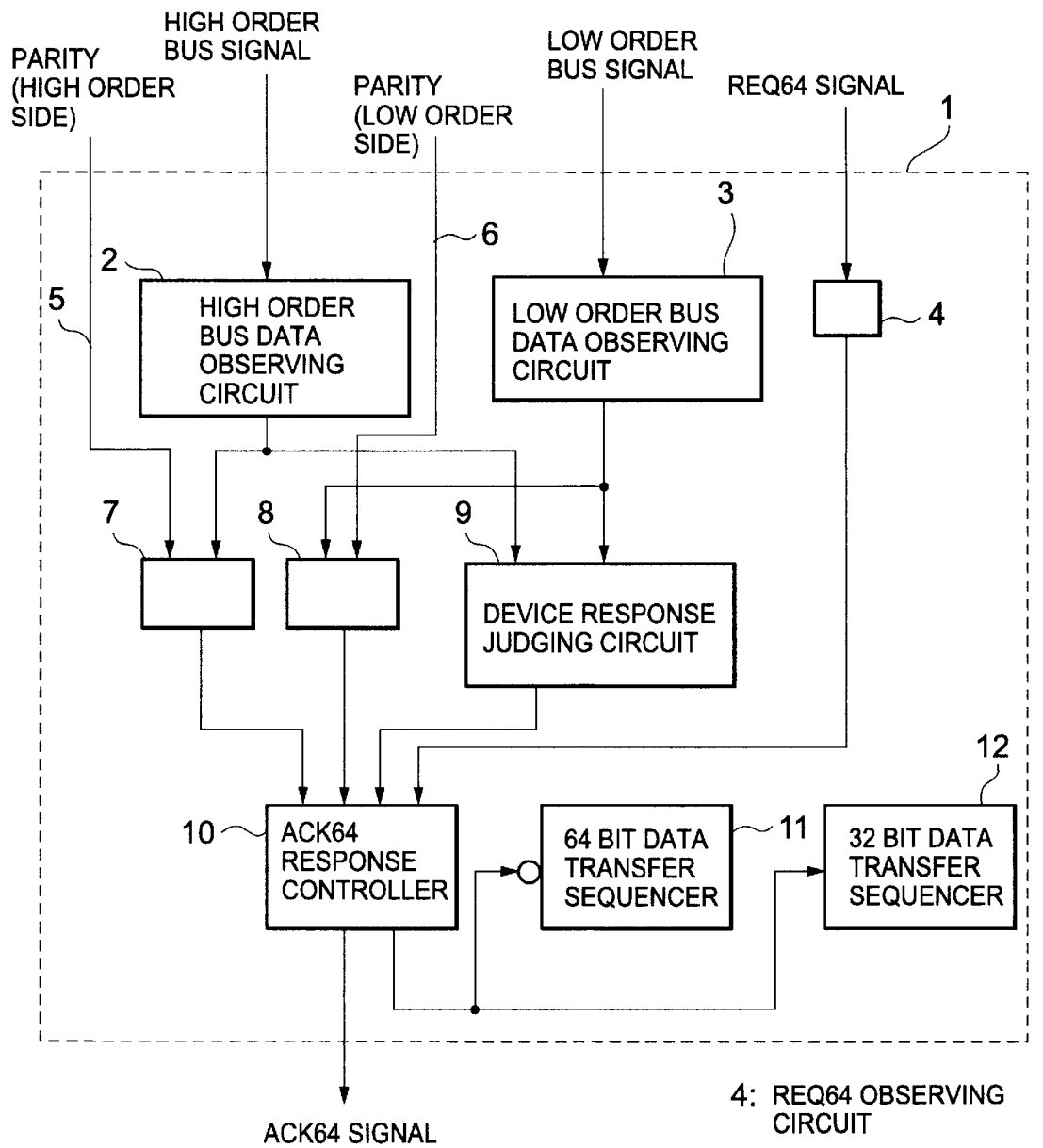
FIG. 2 is a block diagram of a first embodiment of the present invention.

Referring to FIG. 2, PCI device 1 includes a high order bus data observing circuit 2, a low order bus data observing circuit 3, a REQ64 observing circuit 4, a device response determination circuit 9, a high, order bus data parity checker 7, a low order bus data parity checker 8, an ACK64 response controller 10, a 64-bit data transfer sequencer 11, and a 32-bit data transfer sequencer 12.

PCI device 1 observes a 64-bit PCI bus signal by using high order bus data observing circuit 2 and low order bus data observing circuit 3. High order bus data observing circuit 2 receives a high order 32-bit PCI bus signal from the source of the request and observes the high order 32-bit PCI bus signal. Low order bus data observing circuit 3 receives a low order 32-bit PCI bus signal from the source of the request and observes the low order 32-bit PCI bus signal. High order bus data observing circuit 2 and low order bus data observing circuit 3 send the observation data to device response determination circuit 9, high order bus data parity checker 7, and low order bus data parity checker 8 at the time of a request address being issued to the PCI bus.

REQ64 observing circuit 4 receives a REQ64 signal, which is an identification signal of a 64-bit data transfer request, from the source of the request and observes the REQ64 signal. Device response determination circuit 9 receives observation results from high order bus data observing circuit 2 and low order bus data observing circuit 3 when a request address is issued to PCI bus 200, and determines whether or not the request issued to the bus is a request to its own device.

High order bus data, parity checker 7 receives the observation result from high order bus data observing circuit 2 and a parity signal 5 of the high order bus data. High order bus data parity checker 7 checks a parity of high order bus data. Low order bus data parity checker 8 receives the observation result from low order bus data observing circuit 3 and a parity signal 6 of the low order bus data. Low order bus data parity checker 8 performs a parity check of low order bus data. ACK64 response controller 10 sends an ACK64 signal to a request source. 64-bit data transfer sequencer 11 performs 64-bit data transfer processing. 32-bit data transfer sequencer 12 performs 32-bit data transfer processing.

If device response determination circuit 9 determines that the request is a request to its own device, if REQ64 observing circuit 4 indicates that the request is a 64-bit data transfer request, and if high order bus data parity checker 7 and low order bus data parity checker 8 do not detect a parity error, ACK64 response controller 10 sends an ACK64 signal to the request source. PCI device 1 indicates that PCI device 1 will respond to the 64-bit data transfer, and activates 64-bit data transfer sequencer 11 to start the 64-bit data transfer processing.

On the other hand, if high order bus data parity checker 7 detects a parity error, ACK64 response controller 10 does not send an ACK64 signal to the request source. PCI device 1 indicates that PCI device 1 will not respond to the 64-bit data transfer, and activates 32-bit data transfer sequencer 12 to start 32-bit data transfer processing. The request source switches the 64-bit data transfer request to the 32-bit data transfer due to the lack of an ACK64 signal. Thus, PCI device 1 continues to execute the data transfer with the low order bus.

Next, the operation of this embodiment will be described.

PCI device 1, which is configured for an m-bit wide bus and is operable for an m/n-bit wide bus (where m/n is an integer), determines whether or not there is a fault during the empty cycle of the bus. The device continues the operation for an m or m/n-bit wide bus without interruption for recovery operation even if the device detects a fault.

For example, in a PCI device supporting a 64-bit bus, if the high order bus fails in an address phase of a 64-bit data transfer transaction, the PCI device continues the transaction by using the low order bus, as a PCI device supporting only a 32-bit bus, without interruption for recovery.

In FIG. 2, when a PCI device 1 receives a request address for a 64-bit data transfer, PCI device 1 checks the parity of the data received from a high order bus and a low order bus. In the 64-bit data transfer in a 64-bit PCI bus, effective data of the request address is sent through the low order bus, and the data sent through the high order bus is secured only on parity, but can be treated as invalid data for address information. Therefore, when issuing the request address for a 64-bit data transfer transaction, the high order bus can be regarded as an empty cycle. If PCI device 1 does not detects a parity error in the data received from the high order and low order buses, PCI device 1 outputs an ACK64 signal to the source of the 64-bit data transfer request and activates 64-bit data transfer sequencer 11. 64-bit data transfer sequence 11 starts the 64-bit data transfer transaction.

On the other hand, when PCI device detects a parity error in the data received from the high order bus, PCI device 1 does not treat this as a critical error, but informs the request source that PCI device 1 cannot perform the 64-bit data transfer.

In this embodiment, instead of informing the request source, ACK64 response controller 10 does not output an ACK64 signal to the source of the 64-bit data transfer request. Because the source of the 64-bit data transfer request does not receive an ACK64 signal, the source of the 64-bit data transfer request recognizes PCI device 1 as a device supporting only the 32-bit data transfer and switches the 64-bit data transfer to the 32-bit data transfer.

PCI device 1 starts the 32-bit data transfer transaction by activating a 32-bit data transfer sequencer 12. Thus, even if the high order bus fails, it is possible to continue the transaction by using the low order bus.

Figure 3:
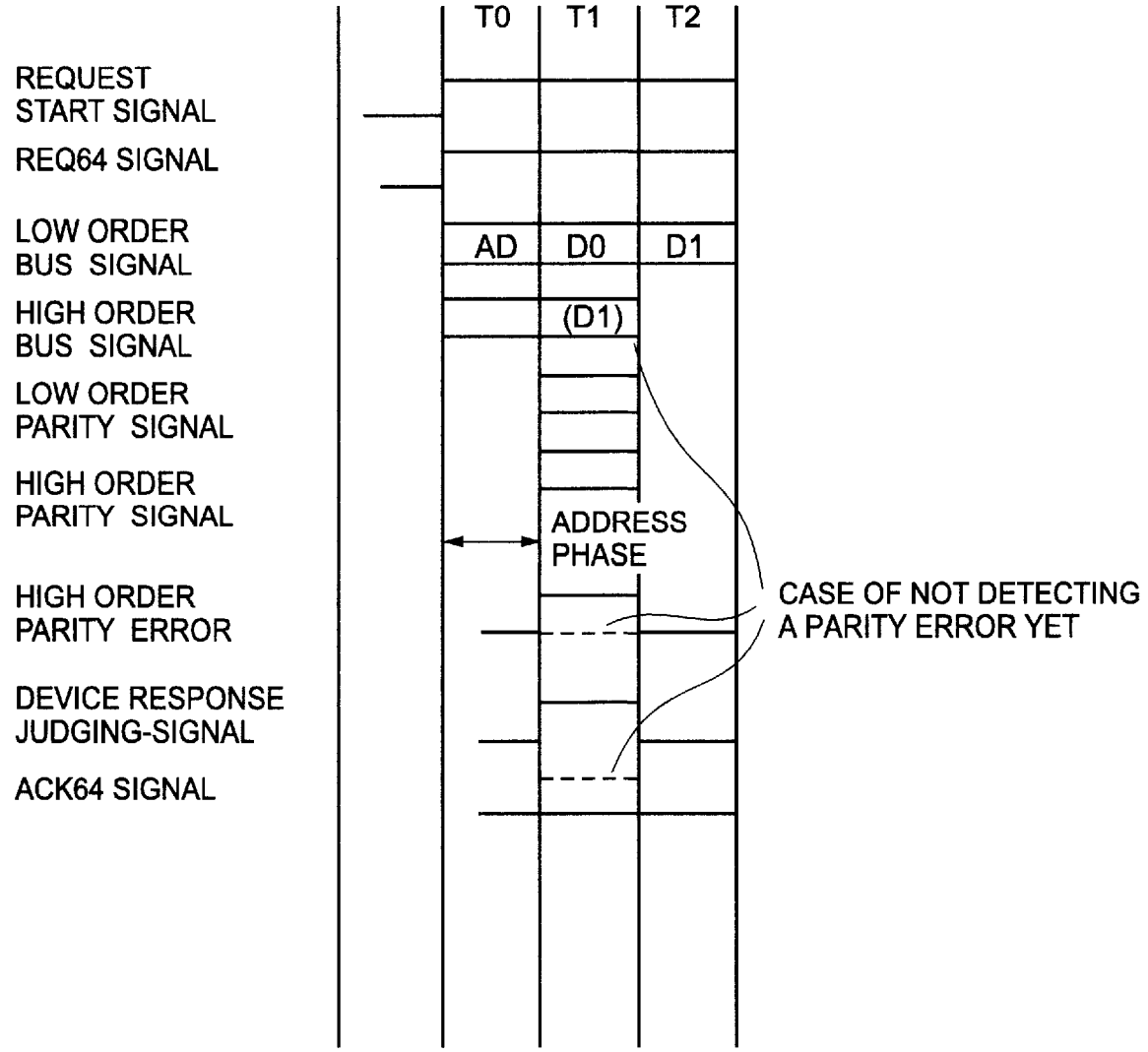
FIG. 3 is a time sequence chart showing the bus access controller of the present invention.

Referring to FIG. 3, a request address is issued to the bus at a period T0. At this timing high order bus data observing circuit 2 and low order bus data observing circuit 3 send observation results, i.e., a request address, to device response determination circuit 9, high order bus data parity checker 7, and low order bus data parity checker 8.

Device response determination circuit 9 determines whether or not the received request address is a request to its own device. If the request address is the request to its own device, device response determination circuit 9 informs ACK64 response controller 10 that the request addresses to its own device.

REQ64 observing circuit 4 observes the REQ64 signal indicating that the request issued at the period T0 is the 64-bit data transfer request. If the request is the 64-bit data transfer request, REQ64 observing circuit 4 informs ACK64 response controller 10 that the request is the 64-bit data transfer request.

In a period T1, the source of the request sends parity signals of the high order bus data and low order bus data after a cycle from an issue of the request address. High order bus data parity checker 7 and low order bus data parity checker 8 input the parity signals of the high order bus data and low order bus data, respectively. High order bus data parity checker 7 and low order bus data parity checker 8 check the parity of the high order bus data and low order bus data which is received at the period T0, respectively. High order bus data parity checker 7 and low order bus data parity checker 8 outputs the check result to ACK64 response controller 10.

Device response determination circuit 9 informs ACK64 response controller 10 that the request is the request to its own device. REQ64 observing circuit 4 informs ACK64 response controller 10 that the request is the 64-bit data transfer request. High order bus data parity checker 7 and low order bus data parity checker 8 inform ACK64 response controller 10 that checkers 7 and 8 do not detect a parity error. ACK64 response controller 10 receives the information, performs the instruction of activating 64-bit data transfer sequencer 11, and responds to the request source with an ACK64 signal to inform the request source of receiving the 64-bit data transfer.

On the other hand, when high order bus data parity checker 7 detects a parity error, high order bus data parity checker 7 informs ACK64 response controller 10 that the checker 7 detects the parity error. Device response determination circuit 9 informs ACK64 response controller 10 that the request is the request to its own device. REQ64 observing circuit 4 informs ACK64 response controller 10 that the request is the 64-bit data transfer request. Low order bus data parity checker 8 informs ACK64 response controller 10 that the checker 8 does not detect a parity error. ACK64 response controller 10 activates 32-bit data transfer sequencer 12, and informs the request source that PCI device 1 will not receive the 64-bit data transfer, by not responding with an ACK64 signal. Not outputting an ACK64 signal by ACK64 response controller 10, the request source switches the 64-bit data transfer to the 32-bit data transfer. Thus, the PCI device performs data transfer with the low order bus without using the high order bus.

If a parity error is not detected in the high order bus data and low order bus data of a request address which are sent in period T0, the 64-bit data transfer is performed for one period by using the high order bus and low order bus in period T1 and thereafter. Thus, in period T1, transfer of data D1 and D0 is performed through the high order bus and low order bus, respectively.

If a parity error is detected in the high order bus data sent during period T0, data D1, which would be transferred through the high order bus in period T1, is transferred through the low order bus in the period T2. Thus, the PCI device performs the 32-bit data transfer through the low order bus in the period T1 and thereafter.

Next, a second embodiment of the present invention will be described.

Figure 4:
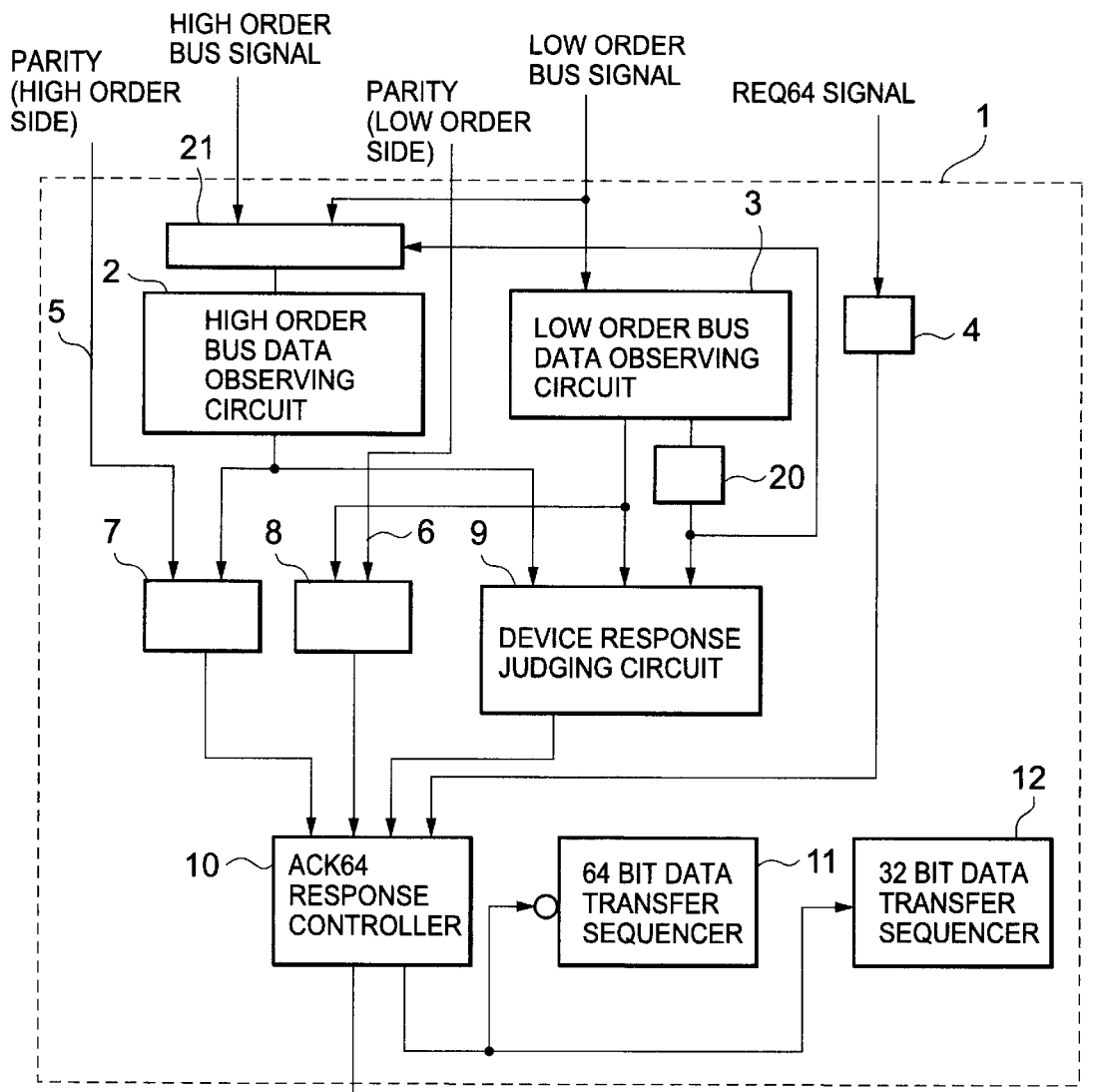
FIG. 4 is a block diagram of a second embodiment of the present invention.

Referring to FIG. 4, a PCI device 1, i.e., a bus access controller, includes a circuit 21 which selects either of the high order bus data and low order bus data for a data input block of high order bus data observing circuit 2, and a circuit 20 which detects a fault of low order bus data observing circuit 3. The other structures are the same as those in the first embodiment.

Circuit 21 inputs and selects a high order bus signal and a low order bus signal. Circuit 21 outputs the selected one of the high order bus signal and the low order bus signal to high order bus data observation circuit 2. Circuit 20 receives the observation result of low order bus data observing circuit 3. Circuit 20 outputs the detected result to device response determination circuit 9.

If low order bus data observing circuit 3 fails, the PCI device cannot normally receive a low order bus signal, therefore, all the functions as a PCI device become inoperative. Circuit 21 selects and outputs low order bus data to high order bus data observing circuit 2. Thus, PCI device 1 makes it possible to secure functions for a 32-bit transfer even if low order bus data, observing circuit 3 fails, by using high order bus data observing circuit 2 as substitution for low order bus data observing circuit 3.

As described above, it is possible to transfer data by using the low order bus if the high order bus fails but the low order bus is normal. Data transfer is performed after selecting a transfer mode at the time of requesting a data transfer. A robust bus control circuit that can handle intermittent faults and faults of the low order bus can be attained.

While this invention has been described in conjunction with the preferred embodiments described above, it will now be possible for those skilled in the art to put this invention into practice in various other manners.

What is claimed is:

1. A bus control circuit connected to a request source through a bus comprising:
   a first element which observes a signal on a low order of said bus;
   a second element which detects a fault of said first element;
   a third element which selects and outputs said signal on said low order of said bus or a signal on a high order of said bus based on the detection of said second element; and
   a fourth element which observes an output from said third element.

2. The bus control circuit as claimed in claim 1, further comprising:
   a fifth element which detects a fault of said high order of said bus when data is sent through said high order and said low order of said bus; and
   a sixth element which output a signal showing that data cannot be send through said high order and said low order of said bus to said request source when said fifth element detects said fault.

3. The bus control circuit as claimed in claim 2, wherein said fifth element detects a fault during an empty cycle of the bus.

4. The bus control circuit as claimed in claim 3, wherein said empty cycle is an address phase.

5. The bus control circuit as claimed in claim 2, further comprising a seventh element which performs a data transfer through said high order and said low order of said bus; and
   wherein said sixth element activates said seventh element when said fifth element does not detect said fault.

6. The bus control circuit as claimed in claim 2, further comprising a eighth element which performs a data transfer through said low order of said bus; and
   wherein said second element activates said eighth element when said fifth element detect a fault in said high order of said bus.

7. A bus control system comprising:
   a host device;
   a control circuit;
   a bus which connects said host device and said control circuit and includes a first part and a second part;
   a first element which is provided in said control circuit and detects a fault of said first part when said host device sends data through said first and second parts;
   a second element which is provided in said control circuit and outputs a signal showing that it is impossible to send data through said first and second parts to said host device; and
   a third element, which is provided in said host device, receives said signal and starts to send data through said second part.

8. The bus control system as claimed in claim 7, wherein said first and second parts are a high order and low order parts, respectively.

9. The bus control circuit as claimed in claim 7, wherein said first element detects a fault during an empty cycle of the bus.

10. The bus control circuit as claimed in claim 9, wherein said empty cycle is an address phase.

11. The bus control circuit as claimed in claim 7, further comprising a fourth element which performs a data transfer through said first and second parts of said bus; and
    wherein said second element activates said fourth element when said first element does not detect said fault.

12. The bus control circuit as claimed in claim 7, further comprising a fifth element which performs a data transfer through said second part of said bus; and
    wherein said second element activates said fifth element when said first element detects a fault in said first part of said bus.

* * * * *